United States Patent [19]

Parkinson

[11] 4,023,583
[45] May 17, 1977

[54] VENT VALVE WITH BACK PRESSURE CHECK

[75] Inventor: Lindley A. Parkinson, Anoka, Minn.

[73] Assignee: Brown-Minneapolis Tank & Fabricating Co., Minneapolis, Minn.

[22] Filed: Nov. 10, 1975

[21] Appl. No.: 630,199

[52] U.S. Cl. .................................. 137/39; 137/43; 137/493.3; 137/493.6; 220/202; 220/203

[51] Int. Cl.² ........................................ F16K 17/36

[58] Field of Search ........ 137/43, 39, 493.3, 493.6; 220/202, 203

[56] References Cited

UNITED STATES PATENTS

| 3,280,838 | 10/1966 | Parkinson | 137/43 X |
| 3,568,695 | 3/1971 | DeFrees | 137/43 |
| 3,938,692 | 2/1976 | Crute | 137/43 X |

Primary Examiner—Robert G. Nilson
Attorney, Agent, or Firm—Burd, Braddock & Bartz

[57] ABSTRACT

A valve apparatus for limiting the pressure of gases in an enclosed tank. The valve has a body mounted on the tank wall structure providing a passage into the tank chamber. A breather intake valve surrounds the body and allows air to flow into the tank chamber when sub-atmospheric pressure is present in the tank chamber. A valve assembly located in the passage operates to allow excessive gas pressure to escape from the tank chamber. The valve assembly has a first valve that closes, should the tank partially or totally overturn, to prevent liquid from flowing out of the tank and a second valve that is normally biased closed to prevent the escape of gases and vapor from the tank chamber to the atmosphere.

26 Claims, 4 Drawing Figures

VENT VALVE WITH BACK PRESSURE CHECK

BACKGROUND OF INVENTION

Vent valves as described by Parkinson in U.S. Pat. No. 3,280,838 are used on liquid transporting tanks to limit the gas pressure in the tanks by permitting gas to escape from and enter the closed tank. The vent valves also function to prevent leakage of liquid from the tank on surging of the liquid in the tank and limit the flow of liquid from the tank in the event the tank is partially or totally overturned. An example of a transport tank is shown by Brown et al in U.S. Pat. No. 2,669,250. When tanks of this type are filled with liquid, as gasoline, the gases and vapors of the tank are vented to the atmosphere. These vapors are a source of air pollution Many localities do not allow venting of tanks to the atmosphere during the filling operation. Special venting systems have been developed to avoid venting the vapors into the atmosphere. In one system, the tank is filled through a tight connection and the air and vapors are vented through a special valving structure and suitable lines that carry the vapors and gases to a confined area separated from the atmosphere. After the tank is filled, the special valve is closed and not used during transportation of the tank.

SUMMARY OF INVENTION

The invention is directed to a fluid pressure actuated valve unit and more particularly to a valve apparatus used with liquid transporting tanks to limit the gas pressure in the tank chamber. The valve apparatus has a tubular body forming a passage open to a chamber of a tank and the environment outside the chamber. A valve assembly mounted on the body controls the flow of fluid, as air and liquid, through the passage. A biasing means as a spring, biases the valve assembly to its closed position. The valve assembly has a base means having an opening. The opening is selectively opened and closed with first and second valve means. The first valve means has a normally open valving member operable to close the opening in the base means in the event the tank is overturned. The first valving member comprises a disc-like member carrying a weight which normally holds the valving member in its open position. The second valve means has a normally closed valving member operable to close the passage in the base means. Biasing means, as a spring, urges the valving member of the second valve means to its closed position. The second valving means is a spring loaded back pressure check valve which opens in response to a minimum low pressure, for example, ½ psi, in the chamber.

An object of the invention is to provide a vent valve that is operable to permit gas to escape from and enter a closed tank, to prevent leakage of liquid from the tank on surging of the liquid therein, and to limit the flow of liquid from the tank in the event the tank is overturned with a check valve that prevents the escape of gases and vapors from the tank below a minimum low pressure. A further object of the invention is to incorporate into a vent valve and valving arrangement which does not allow low pressure venting of the tank to the atmosphere when the tank is filled with liquid. Another object of the invention is to provide a vent valve useable with a vapor recovery unit structure which allows venting of vapors in the tank back to a supply tank when the transport tank is being filled. Yet another object of the invention is to provide a rugged and compact valve apparatus which includes a vent valve and a vapor check valve for use in a tank which is simple and economical in construction and reliable and effective in use. These and other objects of the invention will become apparent from the following detailed description of the invention.

IN THE DRAWINGS

DESCRIPTION OF PREFERRED EMBODIMENT

Figure 1:
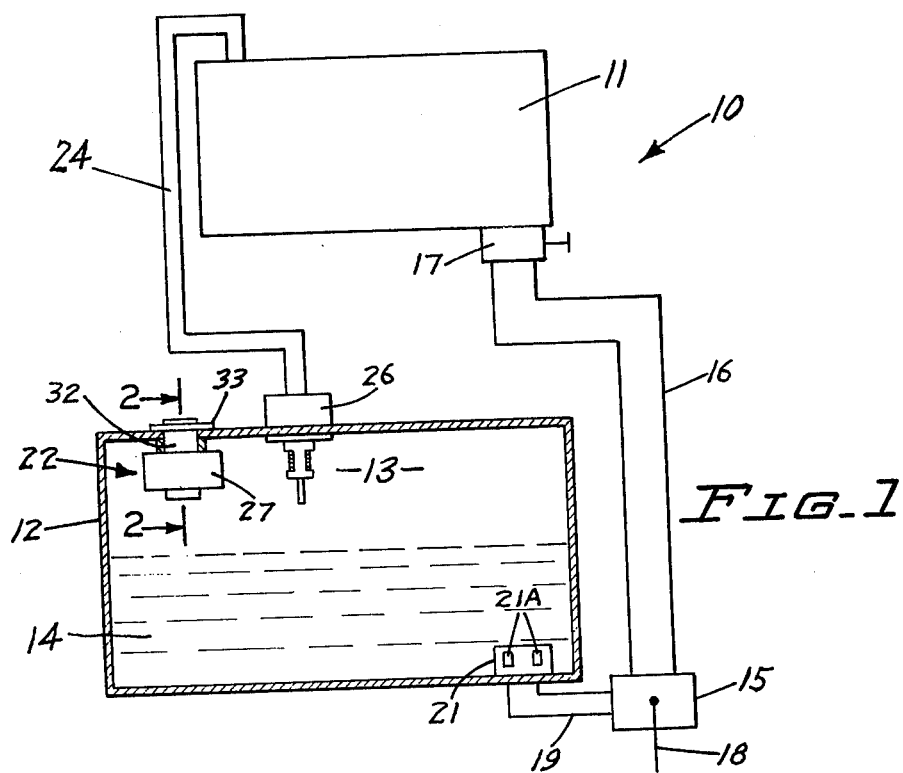
FIG. 1 is a diagrammatic view of a liquid and gas handling system having the valve apparatus of the invention.

Referring to FIG. 1, there is shown a diagrammatic view of the liquid and gas handling system for loading liquids, as gasoline, fuel oil, and other petroleum products into a transport container, as a tank truck or trailer. The liquid is stored in a tank 11. Tank 11 can be a large cylindrical storage tank such as the tanks that are conventionally used to store liquid petroleum. A transport tank 12 is used to carry the liquid from the storage tank 11 to industrial and retail users of the liquid. Tank 12 is the conventional trailer-type tank that is adapted to be towed with a tractor or a tank mounted directly on the frame of a truck. An example of a liquid transport tank vehicle is disclosed by Brown et al in U.S. Pat. No. 2,669,250. Tank 12 has a chamber 13 for accommodating liquid 14.

A line 16, as a hose or pipe, is used to carry the liquid from the storage tank 11 into the tank 12. A control valve 17 is used to control the flow of liquid through the line 16. Suitable pump structures can be used to pump liquid from the tank 11 into the tank 12 through line 16. Line 16 is attached to coupler 15 having an emergency valve 18. Line 16 can be a loader pipe releasably connected to an adapter having a Y-valve. The adapter is the coupler 15 connected with line 19 to the bottom of tank 12. Line 19 is open to an emergency valve 21 located in chamber 13 and mounted on the bottom wall of tank 12. Valve 21 has a plurality of discharge openings 21A used to bottom fill chamber 13 with liquid 13. Mechanical linkages (not shown) are used to turn valve 21 on and off.

The valve apparatus of the invention, indicated generally at 22, is mounted on the top wall 23 of the tank 12. An elongated line 24 connects vapor recovery vent structure 26 to the top of storage tank 11. The line 24 functions to carry vapors and gases from the top of chamber 13 into the tank 11 during filling of the tank 12, thereby minimizing escape of vapors into the atmosphere. A releasable coupling (not shown) connects line 24 to vent structure 26 so that line 24 can be disconnected from tank 12 to permit the tank to be transported to another location. Vent structure 26 can be an OPW 957 vapor recovery vent.

Figure 2:
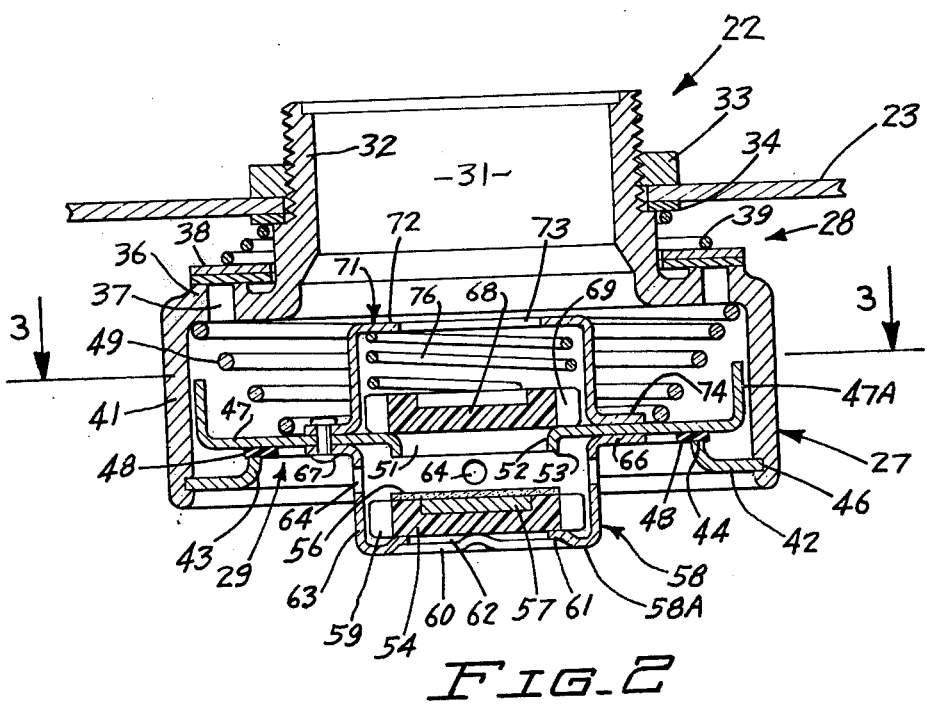
FIG. 2 is an enlarged sectional view of the valve apparatus of FIG. 1 taken along line 2—2.

Referring to FIG. 2, valve apparatus 22 has a bell-shaped tubular body or housing 27 mounted on the top wall 23. A breather intake valve assembly indicated generally at 28 surrounds the midportion of body 27 and functions to permit the flow of air through body 27 into the tank chamber 13. Valve assembly 28 opens in response to sub-atmospheric or vacuum pressure in chamber 13 caused by a change in the temperature of the gas and liquid in the chamber or when the liquid is drained or withdrawn from the tank 14.

A second or pressure release valve assembly indicated generally at 29 is operatively located within body 27 to vent positive or super-atmospheric fluid pressure in the tank to the atmosphere. Valve assembly 29 operates to exhaust low pressure gas caused by expansion of the liquid in the tank and functions as an emergency relief valve to release excessive fluid pressure that may develop in the tank chamber 13.

Body 27 has a stepped axial passage 31 having an exhaust end second 32 with external threads. A nut 33 threaded on end section 32 engages the top wall 23 to clamp the body 27 to the top wall 23. The inside surface of wall 23 engages an annular waher 34 located between body 27 and wall 23.

Body 27 has an outwardly directed annular shoulder 36 having a plurality of holes 37. The breather intake valve assembly 28 comprises an annular valving ring 38 operable to close the holes 37. A conical shaped coil spring 39 rests on top of ring 38 and engages the washer 34 to bias the valving ring 38 into engagement with the top of shoulder 36 to close holes 37. On a reduction of pressure of the gas in chamber 13 to below the atmospheric pressure, the valving ring 38 moves upwardly against the biasing force of spring 39 whereby air flows by pasage 31 and holes 37 into tank chamber 13. When the inside and outside pressures are substantially equal, the spring 39 will bias the ring 38 to its closed position in engagement with the top of shoulder 36, as shown in FIG. 2.

Body 27 has an enlarged cylindrical or tubular section 41 surrounding an annular ring 42. Ring 42 has an upwardly curved circular flange 43 which provides an annular seat 44 for the pressure release valve assembly 29. The ring 42 has an outer peripheral edge located in an annular groove 46 in the inside intake end of cylindrical section 41.

Figure 3:
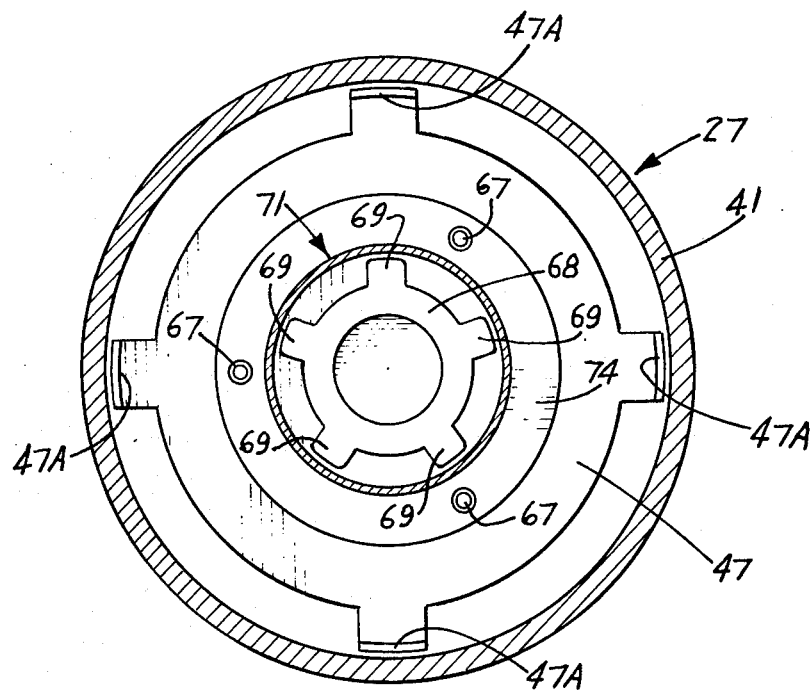
FIG. 3 is a sectional view taken along line 3—3 of FIG. 2.
Figure 4:
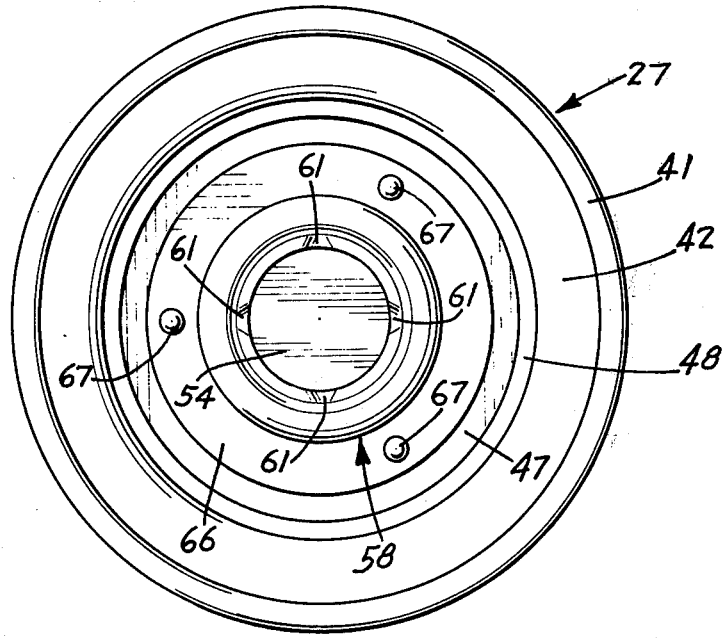
FIG. 4 is a bottom plan view of FIG. 2.

Pressure release valve assembly 29 has a base, plate or disc 47 having a plurality of upwardly directed guide members or fingers 47A circumferentially spaced around the outer edge of the disc. The fingers 47A are located in close proximity to the inside wall of cylindrical section 41 so as to center the valve assembly 29 and guide the valve assembly 29 in a linear path toward and away from the ring 42. As shown in FIG. 3, fingers 47A extend radially outwardly from the base 47 to provide large arcuate spaces between the fingers. Thus, there is a larger passage for the gases to escape through passage 31 when the valve assembly is open.

An annular ring or washer 48 of flexible material is secured to the lower side of disc 47. The washer 48 engages the annular seat 44 on flange 43. A conical coil spring 49 engages the top of disc 47 and the inside of shoulder 46 to bias the disc 47 and ring 48 in engagement with seal 44.

The disc 47 has a circular central opening 51 formed by a downwardly directed circular flange 52. Flange 52 terminates in a circular bottom edge 53 forming a seat for a first valving element or disc 54. The valving element 54 has a top plate 56 extended over a weight, as a metal core 57. The valving element 54 has a plurality of outwardly directed circumferentially spaced ears 59 which terminate in close proximity to a cup-shaped cage 58 secured to the disc 47. Cage 58 has a bottom wall 58A having a central opening 60. Bottom wall 58A has a plurality of circumferentially spaced upwardly directed indentations 61. When the valve element 54 is in its lowered position, as shown in FIG. 2, it rests on the indentation 61 leaving spaces 62 between the valve element 54 and the bottom wall 58A.

Cage 58 has a cylindrical side wall 63 having a plurality of holes 64. The holes 64 permit the air to flow into the cage 58 above valve element 54. The upper end of side wall 63 is integral with an outwardly directed annular flange 66. A plurality of fasteners 67, as rivets, secure the flange to the disc 47.

Located above disc 47 is a second valving element 68 having a plurality of outwardly directed circumferentially spaced ears 69. Ears 69 cooperate with a cage indicated generally at 71 for linearly guiding the valving element 68 toward and away from the disc 47. Cage 71 has an inwardly directed top wall or flange 72 formed with a circular central opening 73. The lower end of cage 71 has an outwardly directed annular flange 74. Fasteners 67 are used to attach the flange to the top of disc 47.

A coil spring 76 is located within the cage 71 and biases the valving element 68 to the closed position in engagement with the top of the disc to close opening 51. The upper part of spring 76 engages the flange 72. Spring 76 exerts a light biasing force on valving element 68, thereby keeping the passage 31 closed under small pressure changes in tank chamber 13. For example, spring 76 can have a biasing force of ½ psi. Other biasing forces can also be employed by spring 76.

In use, valve apparatus 22 is mounted on the top wall 23 of a container, such as a tank vehicle. The valve apparatus 22 functions as a vent valve as it controls the fluid pressure in the tank chamber. The vacuum release valve 28 operates to permit entrance of air into the tank chamber in response to a vacuum pressure in the chamber. The valve 28 is normally closed to prevent the flow of both liquid and gas that are in the tank to flow to the atmosphere. An increase in the pressure of the fluid in the tank chamber is controlled by the pressure release valve assembly 29. Valve assembly 29 has a large emergency valve comprising the base 47 which is biased into engagement with the seat 44 with spring 49. The base 47 is moved to its open position against the force of spring 49 in response to excessive pressure in the tank. When the valve is open, the excessive pressure is quickly relieved.

Valve disc 68 is normally closed with spring 76. When there is a nominal increase in the fluid pressure in the tank, the valve disc 68 will move to its open position against the biasing force of spring 76 to allow the gases to escape from the tank. As soon as the pressure is relieved, the spring 76 will return valving member 68 to its closed position shown in FIG. 2. In the event the tank is overturned, the valving member 54 will move to its closed position in engagement with seat 53. The weight 57 carries the valving member 54 to its closed position. This prevents escape of liquid through the valve apparatus in the event of a change of position of the tank.

As shown in FIG. 1, when the tank 12 is being filled with liquid 14, the gases and vapors in the top of chamber 13 must be vented. A line 24 is connected to vapor recovery vent structure 26 to provide a vapor passage between tanks 11 and 12. Line 24 is connected to the top of supply tank 11. Liquid in tank 11 is either drained or pumped into tank 12. FIG. 1 shows a line 16 for carrying liquid from tank 11 to the bottom of tank 12. Other types of liquid conveying means can be used to transfer the liquid from tank 11 to transport tank 12.

While there has been shown and described a preferred embodiment of the invention, it is understood that modifications and variations of the valve apparatus hereinbefore disclosed may be made by those skilled in the art without departing from the invention.

The embodiments of the invention in which an exclusive property or privilege is claimed are defined as follows:

1. Valve apparatus for controlling the flow of liquid and gas into and out of container means having a wall providing an enclosed chamber for accommodating a liquid comprising: a body mountable on the wall, said body having a passage open to the chamber and the environment outside the container means, an annular member having a central opening mounted on the body, a valve assembly for controlling the flow of liquid and gas through said passage, said valve assembly comprising base means engageable with the annular member to close the passage, first spring means engageable with the body and base means to bias the base means into engagement with the annular member, said base means having an opening allowing fluid and gas to flow through said passage, first valve means operable to close said opening, said first valve means having first cage means secured to the normally bottom side of the base means, said first cage means comprising a cup-shaped member fastened to the base means, first valving means comprising a disc-like member located within the cup-shaped member of the first cage means movable to a first position away from the base means to open the opening and movable to a second position in engagement with the base means to close the opening, second valve means operable to normally close the opening in the base means, said disc-like member having weight means whereby the disc-like member is normally spaced from the base means so that the opening in the base means is normally closed by the second valve means, said cup-shaped member having a bottom wall having a central opening, said bottom wall having a plurality of upwardly directed portions holding the disc-like member spaced from the bottom wall, said second valve means having second cage means secured to the normally top side of the base means, second valving means surrounded by the second cage means movable to a first position to close the opening in the base means and movable in response to fluid pressure in the chamber to a second position to open the opening to permit gas to flow through the passage, and second spring means for biasing the second valving means to the closed position.

2. The valve apparatus of claim 1 wherein: said base means is a plate member having an annular central flange surrounding the opening in the base means, said flange projected axially toward the first valving means and terminating in an annular edge providing a seat for the first valving means.

3. The valve apparatus of claim 2 wherein: the plate member has a plurality of axially projected fingers located adjacent the body to axially guide the plate member for movement relative to the body.

4. The valve apparatus of claim 1 including: fastening means securing the cup-shaped member and second cage means to the base means.

5. The valve apparatus of claim 1 wherein: the cup-shaped member has at least one hole providing an opening between the chamber and the space above the first valving means.

6. The valve apparatus of claim 1 wherein: the second cage means is an inverted cup-shaped member fastened to the base means, said second valving means is a disc-like element located within the inverted cup-shaped member, said second spring means is a coil spring located within the inverted cup-shaped member engageable with the disc-like element and inverted cup-shaped member to bias the disc-like element into engagement with the base means thereby closing the opening in the base means.

7. The valve apparatus of claim 1 wherein: the body has at least one hole open to the passage and chamber, a valving member engageable with the body to close the hole, and means biasing the valving member into engagement with the body to close the hole.

8. The valve apparatus of claim 1 wherein: said base means is a plate member having an annular central flange surrounding the opening in the base means.

9. The valve apparatus of claim 8 wherein: the cup-shaped member of the first valve means has at least one hole providing an opening between the chamber and the space above the first valving means.

10. Valve apparatus for controlling the flow of liquid and gas into and out of container means having a wall providing an enclosed chamber for accommodating a liquid comprising: a body mountable on the wall, said body having a passage open to the chamber and the environment outside the container means, an annular member having a central opening mounted on the body, a valve assembly for controlling the flow of liquid and gas through said passage, said valve assembly comprising base means engageable with the annular member to close the central opening thereby closing the passage, first spring means engageable with the body and base means to bias the base means into engagement with the annular member, said base means having an opening allowing fluid and gas to flow through said passage, first valve means operable to close said opening, said first valve means having first cage means secured to the normally bottom side of the base means and a movable first valving means located within the first cage means, said base means comprising a plate member having an annular central flange surrounding the opening in the base means, said flange projected axially toward the first valving means and terminating in an annular edge providing an annular seat for the first valving means, said first cage means comprising a cup-shaped member fastened to the plate member, said first valving means comprising a first disc-like member located within the cup-shaped member of the first cage means, said first disc-like member having weight means whereby the disc-like member is normally spaced from the annular seat so that the opening in the plate member is normally closed only with the annular seat, second valve means operable to normally close the opening in the base means, said second valve means having a second cage means comprising an inverted cup-shaped member fastened to the plate member and a movable second valving means, said second valving means comprising a second disc-like member located within the inverted cup-shaped member and movable to a first position to close the opening in the plate member and movable in response to fluid pressure in the chamber to a second position to open the opening to permit gas flow through the passage, and second spring means located within the inverted cup-shaped member and engageable with the second disc-like member located therein to bias the second disc-like member into engagement with the plate member thereby closing the opening in the plate member, said first cup-shaped member of the first valve means having a bottom wall having a central opening, said bottom wall having a plurality of upwardly directed portions holding the first disc-like member of the first valve means spaced from the bottom wall.

11. The valve apparatus of claim 10 wherein: the plate member has a plurality of axially projected fingers located adjacent the body to axially guide the plate member for movement relative to the body.

12. The valve apparatus of claim 10 wherein: the cup-shaped member has at least one hole providing an opening between the chamber and the space above the first valving means.

13. The valve apparatus of claim 10 wherein: the body has at least one hole open to the passage and chamber, a valving member engageable with the body to close the hole, and means biasing the valving member into engagement with the body to close the hole.

14. Valve apparatus for controlling the flow of fluids, as liquids and gases, into and out of an enclosed chamber, said chamber being provided by a container means for accommodating the fluids comprising: a body having a passage open to the chamber and the environment outside the chamber, seat means cooperating with the body surrounding said passage, a valve assembly cooperating with the seat means for controlling the flow of fluids through said passage, means for biasing the valve assembly into engagement with the seat means, said valve assembly having a base means having an opening, first valve means having a cup-shaped cage member fastened to the base means and a normally open disc-like first valving member located within the cup-shaped member operable to close the opening in the base means, second valve means having a normally closed second valving member operable to close the opening, said disc-like member having weight means whereby the disc-like member is normally spaced from the base means so that the opening in the base means is normally closed with only the second valving means, said cup-shaped member having a bottom wall having a central opening, said bottom wall having a plurality of upwardly directed portions holding the disc-like member spaced from said bottom wall, and means to bias the normally closed second valving member to the closed position.

15. The valve apparatus of claim 14 wherein: said base means is a plate member having an annular central flange surrounding the opening in the base means, said flange projected axially toward the first valving means and terminating in an annular edge providing a seat for the first valving means.

16. The valve apparatus of claim 15 wherein: the plate member has a plurality of axially projected fingers located adjacent the body to axially guide the plate member for movement relative to the body.

17. The valve apparatus of claim 14 wherein: the second valve means has an inverted cup-shaped cage member, and fastening means attaching both cup-shaped cage members to the base means, said first valving member being located in the first cup-shaped member and said second valving member being located in said second inverted cup-shaped member.

18. The valve apparatus of claim 14 wherein: the cup-shaped member has at least one hole providing an opening between the chamber and the space above the first valving means.

19. The valve apparatus of claim 14 wherein: the second valve means has an inverted cup-shaped cage member fastened to the base means, said second valving means is a disc-like element located within the inverted cup-shaped member, said means to bias the normally second valving member to the closed position being located within the inverted cup-shaped member and engageable with the disc-like element to bias the disc-like element into engagement with the base means thereby closing the opening in the base means.

20. The valve apparatus of claim 19 wherein: the means to bias the disc-like element to the closed position is a coil spring.

21. Valve apparatus for controlling the flow of fluids, as liquids and gases into and out of an enclosed chamber, said chamber being provided by a container means for accommodating the fluids comprising: a body having a passage open to the chamber and the environment outside the chamber, seat means cooperating with the body surrounding said passage, a valve assembly cooperating with the seat means for controlling the flow of fluid through said passage, means for biasing the valve assembly into engagement with the seat means, said valve assembly having a base means having an opening between the passage and the chamber, first valve means having a cup-shaped cage member fastened to the base means and a normally open first valving member located within the cup-shaped member operable to close the opening in the base means, and second valve means having an inverted cup-shaped cage member fastened to the base means and located in general longitudinal alignment with the cup-shaped member of the first valve means and a normally closed second valving member located within the second inverted cup-shaped member operable to close the opening, and means to bias the second valving member to the closed position in engagement with the base means, each of said cup-shaped members having transverse walls with central openings to facilitate the flow of gas and liquid through said cup-shaped members.

22. The valve apparatus of claim 21 wherein: the first cup-shaped member has a bottom wall having a plurality of upwardly directed portions holding the first valving member spaced from the bottom wall.

23. The valve apparatus of claim 21 wherein: said base means is a plate member having a central flange surrounding the opening in the base means, said flange projected axially toward the first valving means and terminating in an annular edge providing a seat for the first valving means.

24. The valve apparatus of claim 23 wherein: the plate member has a plurality of axially projected fingers located adjacent the body to axially guide the plate member for movement relative to the body.

25. The valve apparatus of claim 21 wherein: the first cup-shaped member has at least one hole providing an opening between the chamber and the space above the first valving means.

26. The valve apparatus of claim 21 wherein: said second valving member is a disc-like element located within the inverted second cup-shaped member, said means to bias the second valving member to the closed position, comprising a coil spring located within the inverted second cup-shaped member and engageable with the disc-like element and inverted second cup-shaped member to bias the disc-like element into engagement with the base means thereby closing the opening in the base means.

* * * * *

UNITED STATES PATENT AND TRADEMARK OFFICE
CERTIFICATE OF CORRECTION

PATENT NO. : 4,023,583

DATED : May 17, 1977

INVENTOR(S) : LINDLEY A. PARKINSON

It is certified that error appears in the above–identified patent and that said Letters Patent are hereby corrected as shown below:

Column 1, line 62, "and" should be -- a --.

Column 2, line 48, "13" should be -- 14 --.

Column 3, line 16, "waher" should be -- washer --.

Column 3, line 50, "larger" should be -- large --.

Column 3, line 57, "seal" should be -- seat --.

Signed and Sealed this twenty-third Day of August 1977

[SEAL]

Attest:

RUTH C. MASON
*Attesting Officer*

C. MARSHALL DANN
*Commissioner of Patents and Trademarks*